(12) United States Patent
Inoue

(10) Patent No.: US 9,286,553 B2
(45) Date of Patent: Mar. 15, 2016

(54) IMAGE FORMING METHOD, NON-TRANSITORY COMPUTER READABLE STORAGE MEDIUM STORED WITH PROGRAM FOR IMAGE FORMING SYSTEM, AND IMAGE FORMING SYSTEM

(71) Applicant: KONICA MINOLTA, INC., Tokyo (JP)

(72) Inventor: Akira Inoue, Machida (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 0 days.

(21) Appl. No.: 14/484,528

(22) Filed: Sep. 12, 2014

(65) Prior Publication Data

US 2015/0077773 A1   Mar. 19, 2015

(30) Foreign Application Priority Data

Sep. 13, 2013 (JP) .................................. 2013-190986

(51) Int. Cl.
*G06K 15/02* (2006.01)
*H04N 1/60* (2006.01)

(52) U.S. Cl.
CPC ........ *G06K 15/1867* (2013.01); *G06K 15/1859* (2013.01); *G06K 15/1823* (2013.01)

(58) Field of Classification Search
CPC .......... G06K 15/1823; G06K 15/1859; G06K 15/1867
See application file for complete search history.

(56) References Cited

U.S. PATENT DOCUMENTS

| 2002/0051199 A1* | 5/2002 | Hatayama .......... G06K 15/1859 358/1.15 |
| 2005/0146742 A1* | 7/2005 | Gregory ................ G06F 3/1211 358/1.15 |
| 2005/0206948 A1 | 9/2005 | Uejo |

FOREIGN PATENT DOCUMENTS

JP   2005-268916 A   9/2005

* cited by examiner

*Primary Examiner* — Quang N Vo
(74) *Attorney, Agent, or Firm* — Buchanan Ingersoll & Rooney PC

(57) ABSTRACT

There is provided an image forming method using an image forming system that includes a plurality of image forming apparatuses. A print setting using attribute information that is necessary for image formation performed by a first image forming apparatus is registered in a second image forming apparatus in advance, it is determined whether a print setting of print data coincides with the registered print setting when a rasterization process of image data is performed by the second image forming apparatus, when the print settings coincide with each other, the attribute information is generated by the second image forming apparatus and is transmitted from the processing unit of the second image forming apparatus to an image forming unit of the first image forming apparatus together with the image data and the print setting, whereby the image formation is performed.

15 Claims, 14 Drawing Sheets

IMAGE FORMING METHOD, NON-TRANSITORY COMPUTER READABLE STORAGE MEDIUM STORED WITH PROGRAM FOR IMAGE FORMING SYSTEM, AND IMAGE FORMING SYSTEM

CROSS-REFERENCE TO RELATED APPLICATION

This application is based on Japanese Patent Application No. 2013-190986 filed on Sep. 13, 2013, the contents of which are incorporated herein by reference.

BACKGROUND

1. Technical Field

The present invention relates to an image forming method, a non-transitory computer readable storage medium stored with a program for an image forming system, and an image forming system.

2. Description of Related Art

In a system including a plurality of image forming apparatuses each including a RIP (Raster Image Processor) that performs a rasterization process of print data and a printer connected to the RIP, in order to uniformize drawing results of print images formed by the image forming apparatuses, there are cases where the rasterization process of the print data is performed by any one of a plurality of RIPs unifiedly. For example, in a hybrid work flow system, the rasterization process of print data can be unifiedly performed by a CTP-RIP (Computer To Plate-Raster Image Processor).

However, for example, in a case where image forming is performed by a digital printer connected to a digital-RIP for a PDF (Portable Document Format) data that is print data, by performing the rasterization process by the CTP-RIP, attribute information disappears. Accordingly, since the attribute information is not included in image data generated by the rasterization process, an outline process, thinning, contour enhancement, and the like (hereinafter, referred to as an "outline process and the like") using the attribute information of a text and a graphic cannot be performed in a digital printer, so that an outlined character is garbled or a thin line is rubbed in a printed image, whereby there is a problem in that the printing quality is degraded.

As a prior art for solving the problem that the printing quality of texts and graphics is degraded by forming an image by the digital printer connected to the digital-RIP for the image data generated by the rasterization process performed by the CTP-RIP, there is the prior art disclosed in Unexamined Japanese Patent Publication No. 2005-268916. According to the prior art, a text and graphic portion among the image data generated by the rasterization process by the CTP-RIP is determined. Then, in a de-screening process for gradation conversion of the image data, gradation conversion using binarization is performed for the portion determined as the text and graphic portion. In this way, the degradation of the printing quality of the text and graphic portion is prevented.

SUMMARY

However, according to the above-described prior art, there is a possibility that a portion having an image attribute in the attribute information of the print data may be erroneously determined as a text or graphic portion. In addition, there is a possibility that a portion having a text or graphic attribute in the attribute information of the print data may be erroneously determined not as a text or graphic portion. As a result, there is a problem in that there is a possibility that the identity between the printed image formed by the digital printer and the original image included in the print data may not be maintained.

The present invention is devised for solving such problems. Specifically, in an image forming system that includes a plurality of image forming apparatuses, when a print setting of the print data for image formation performed by a first image forming apparatus is determined to coincide with the print setting registered in advance as the print setting using attribute information that is necessary for the image formation performed by the first image forming apparatus, the attribute information is generated by a second image forming apparatus based on the print data. Then, the generated attribute information is transmitted to the first image forming apparatus together with the image data generated by the rasterization process performed by the second image forming apparatus for the print data and the print setting, and the first image forming apparatus is caused to perform the image formation for the image data based on the print setting and the attribute information. In this way, an outline process and the like can be performed by using the attribute information that is necessary for the process of the image formation in the image forming apparatus for image data generated by a rasterization process performed by another image forming apparatus. In this way, while the identity of the original image included in the image data is maintained, the degradation of the printing quality of a text and graphic portion of the image data is prevented, and, variations in the drawing results can be prevented by enabling the unification of the rasterization process according to one RIP.

To achieve at least one of the abovementioned objects, an image forming method reflecting one aspect of the present invention comprises the followings. An image forming method using an image forming system that includes a plurality of image forming apparatuses each including a processing unit configured to perform a rasterization process of print data and an image forming unit configured to perform image formation on a sheet based on image data generated by rasterization process performed by the processing unit, the image forming method comprising steps of: (a) registering a print setting using attribute information that is necessary for the image formation performed by an image forming unit of a first image forming apparatus in a processing unit of a second image forming apparatus in advance; (b) determining whether or not any one of print settings of the print data coincides with the print setting registered in the step (a) when the rasterization process of the print data is performed by the processing unit of the second image forming apparatus; (c) causing the processing unit of the second image forming apparatus to generate the attribute information based on the print data when any one of the print settings of the print data is determined to coincide with the print setting registered in the step (a) in the step (b); (d) causing the processing unit of the second image forming apparatus to transmit the attribute information generated in the step (c) to the image forming unit of the first image forming apparatus through the processing unit of the first image forming apparatus together with the image data generated by the rasterization process performed by the processing unit of the second image forming apparatus and the print settings of the image data; (e) causing the image forming unit of the first image forming apparatus to receive the image data, the print settings, and the attribute information transmitted in the step (d) to the image forming unit of the first image forming apparatus through the processing unit of the first image forming apparatus; and (f) causing the image forming unit of the first image forming apparatus to perform the image formation for the image data received in the step (e) based on the print settings and the attribute information received in the step (e).

It is preferable that, the attribute information is information that represents at least one of text data, vector data, and image data.

It is preferable that, in the image formation performed by the image forming unit of the first image forming apparatus based on the print settings and the attribute information, at least one of thinning, an outline process, and contour enhancement is performed.

It is preferable that, the image forming system includes a plurality of the first image forming apparatuses, and the print setting registered in the step (a) is the print setting using the attribute information that is necessary for the image formation performed by the image forming unit of each of the first image forming apparatuses and is registered for each of the first image forming apparatuses in correspondence with a process of the image formation performed by the image forming unit of each of the first image forming apparatuses.

It is preferable that, the image data transmitted from the processing unit of the first image forming apparatus to the image forming unit of the first image forming apparatus is image data that is converted into image data, which can be used for the image formation performed by the image forming unit of the first image forming apparatus, by further performing a re-rasterization process by the processing unit of the first image forming apparatus for the image data generated by performing the rasterization process by the processing unit of the second image forming apparatus.

The objects, features, and characteristics of this invention other than those set forth above will become apparent from the description given herein below with reference to preferred embodiments illustrated in the accompanying drawings.

DETAILED DESCRIPTION

First Embodiment

Hereinafter, an image forming method, a non-transitory computer readable storage medium stored with a program for an image forming system, and an image forming system according to a first embodiment of the present invention will be described in detail with reference to the drawings.

Figure 1:
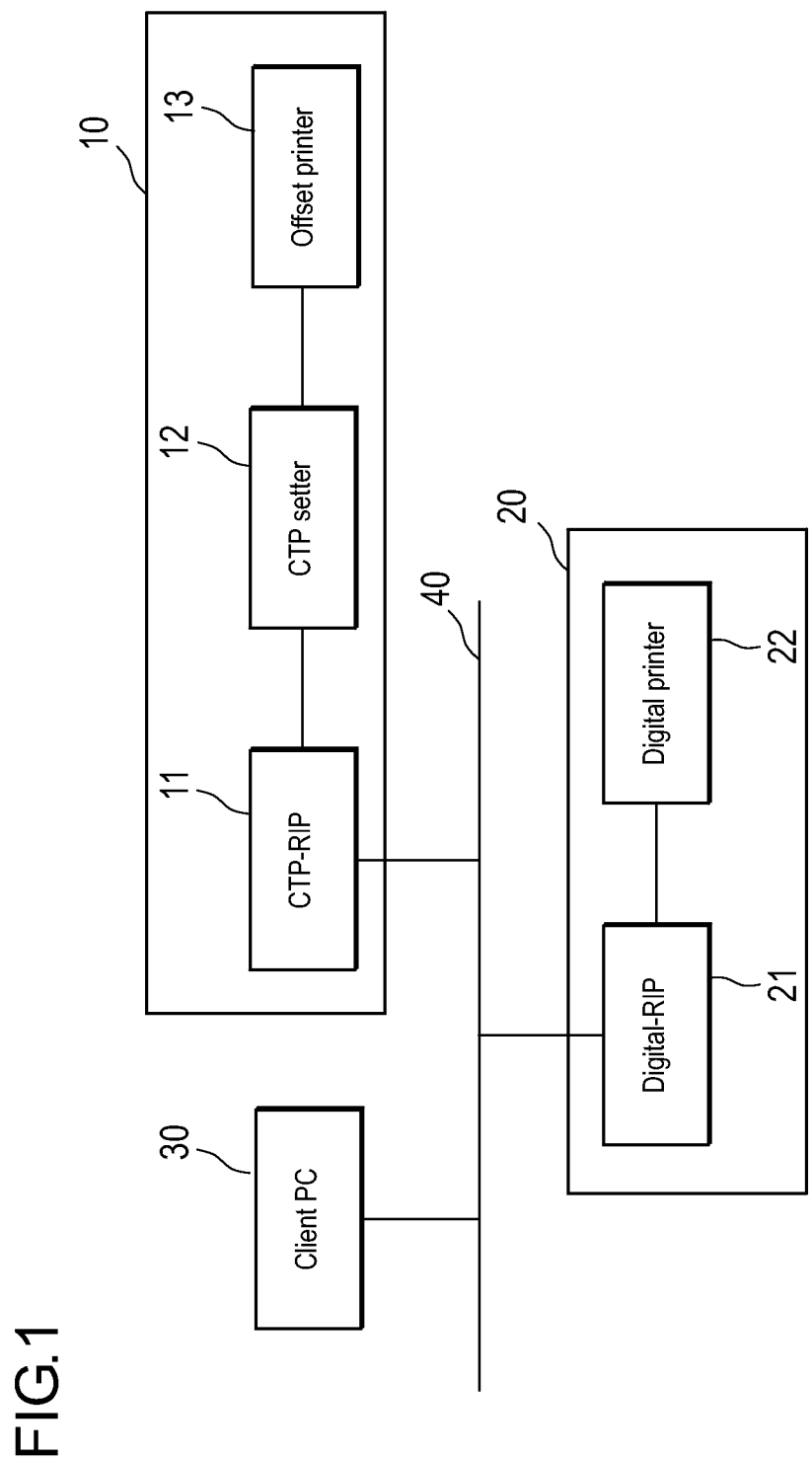
FIG. 1 is a block diagram that illustrates an image forming system according to a first embodiment of the present invention.

FIG. 1 is a block diagram that illustrates the image forming system according to the first embodiment of the present invention.

As illustrated in FIG. 1, the image forming system 1 includes an offset image forming apparatus 10, a digital image forming apparatus 20, and a client PC (Personal Computer) 30. The image forming system 1 may include a plurality of the digital image forming apparatuses 20 and a plurality of the offset image forming apparatuses 10.

The image forming system 1 includes such constituent elements and thereby configures a hybrid workflow system.

The digital image forming apparatus 20 configures a first image forming apparatus, and the offset image forming apparatus 10 configures a second image forming apparatus. A digital-RIP 21 configures a processing unit of the first image forming apparatus, and a CTP-RIP 11 configures a processing unit of the second image forming apparatus. A digital printer 22 configures an image forming unit of the first image forming apparatus, and a CTP setter 12 and an offset printer 13 configure an image forming unit of the second image forming apparatus.

As illustrated in FIG. 1, the offset image forming apparatus 10, the digital image forming apparatus 20, and the client PC 30 are interconnected to be communicable with each other through a network 40. The network 40 may be configured by a LAN (Local Area Network) in which computers and network devices are connected together in compliance with standards such as Ethernet (registered trademark), a token ring, or a FDDI (Fiber-Distributed Data Interface) or a WAN (Wide Area Network) in which LANs are connected to each other using dedicated lines.

The client PC 30 generates a print job of a document to be formed as an image on a sheet by the digital printer 22 or the offset printer 13 by a printer driver and transmits the print job to the CTP-RIP 11 of the offset image forming apparatus 10. The print job is a general term of a print command for an image forming apparatus and includes print data and print setting.

The print data is data of a document that is a printing target. In the print data, for example, various kinds of data such as image data, vector data (graphic data), and text data are included. Specifically, the print data may be PDL (Page Description Language) data, PDF (Portable Document Format) data, or TIFF (Tagged Image File Format) data. In addition, the image data generated by performing a rasterization process for the print data, the print setting, and data including attribute information generated based on the print data are included in the print data. The rasterization process represents converting print data included in the print job into the image data in a bitmap format or converting the image data in the bitmap format into the image data in another bitmap format that can be used for image forming by a specific printer.

The attribute information is included in the print data. The attribute information represents the attribute of each pixel of the print data and, for example, is information representing whether the pixel is image data, vector data, or text data. The attribute information, for example, is included in a tag bit that is generated by performing the rasterization process for the print data.

In the print setting, settings of the image forming apparatus that causes printing, settings of the sheet for printing, settings of contour processing such as smoothing or contour enhancement, and settings of a color converting method are included.

The offset image forming apparatus 10 includes the CTP-RIP (Computer To Plate-Raster Image Processor) 11, the CTP setter 12, and the offset printer 13.

The CTP-RIP 11 performs the rasterization process for the print data of the print job received from the client PC 30.

The CTP setter 12 produces a plate for offset printing based on the image data that is generated by performing the rasterization process for the print data of the print job. The offset printer 13 performs offset printing using the plate.

The digital image forming apparatus 20 includes the digital-RIP 21 and the digital printer 22. The digital-RIP 21 performs an additional rasterization process (hereinafter, referred to as a "re-rasterization process") for the image data generated by the rasterization process performed by the CTP-RIP 11 of the offset image forming apparatus 10. In this way, the image data generated by the rasterization process performed by the CTP-RIP 11 is converted into the image data that can be used for image formation by the digital printer 22.

The digital printer 22 prints the image data for which the re-rasterization process has been performed by the digital printer 22 on the sheet using a no-plate type printing method. The digital printer 22, for example, may be configured by a laser beam printer or an ink jet printer.

Figure 2:
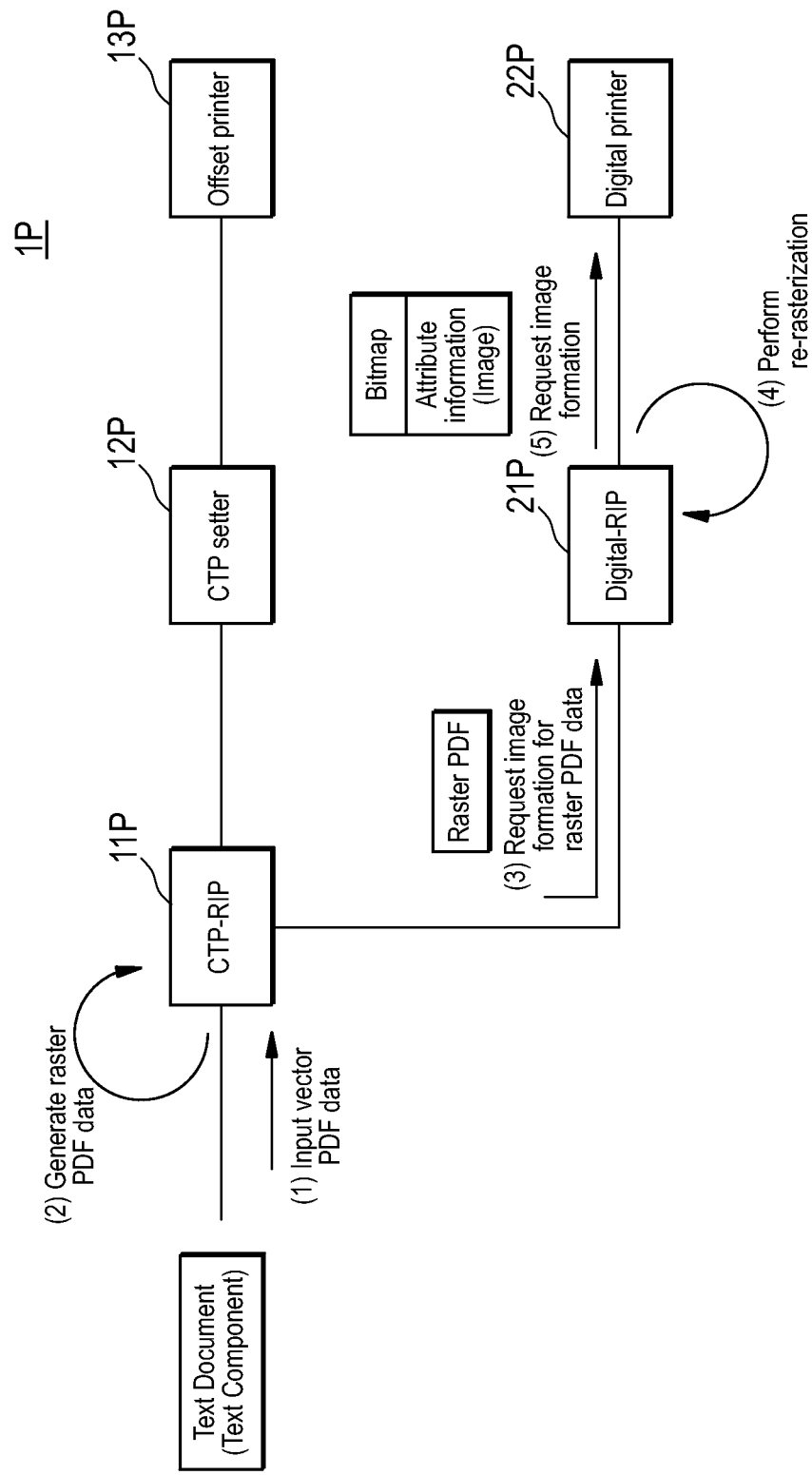
FIG. 2 is a diagram that illustrates a data flow of a case where an image forming is performed by a digital printer in a conventional image forming system.

FIG. 2 is a diagram that illustrates a data flow of a case where an image forming is performed by a digital printer in a conventional image forming system.

As illustrated in FIG. 2, in the conventional image forming system 1P, (1) for example, when vector PDF data that is print data including only a text component (text data) is input to a CTP-RIP 11P, (2) the rasterization process is performed for the vector PDF data by the CTP-RIP 11P so as to generate raster PDF data that is image data. (3) When image formation for the raster PDF data is requested to a digital-RIP 21P by transmitting the raster PDF data to the digital-RIP 21P by the CTP-RIP 11P, (4) the digital-RIP 21P performs the re-rasterization process for the raster PDF data. (5) The digital-RIP 21P transmits the image data that is bitmap data generated by the re-rasterization process to the digital printer 22P together with attribute information of the image data generated by the re-rasterization process, and thereby requests image formation, which is based on the print setting and the attribute information, for the image data.

By the rasterization process for the vector PDF data in "(2)" described above, which is performed by the CTP-RIP 11P, a text component of the vector PDF data is converted into an image component, and the attribute information of the text data included in the vector PDF data disappears. Accordingly, the attribute information generated by the re-rasterization process for the raster PDF data, which is performed by the digital-RIP 21P is the attribute information of only image data, and thus an outline process or the like requiring the attribute information of text data cannot be performed by the digital printer 22P. Accordingly, in the conventional image forming system 1P, an outlined text is garbled or thin lines are rubbed in print image, and therefore, there is a problem in that the printing quality is degraded.

Figure 3:
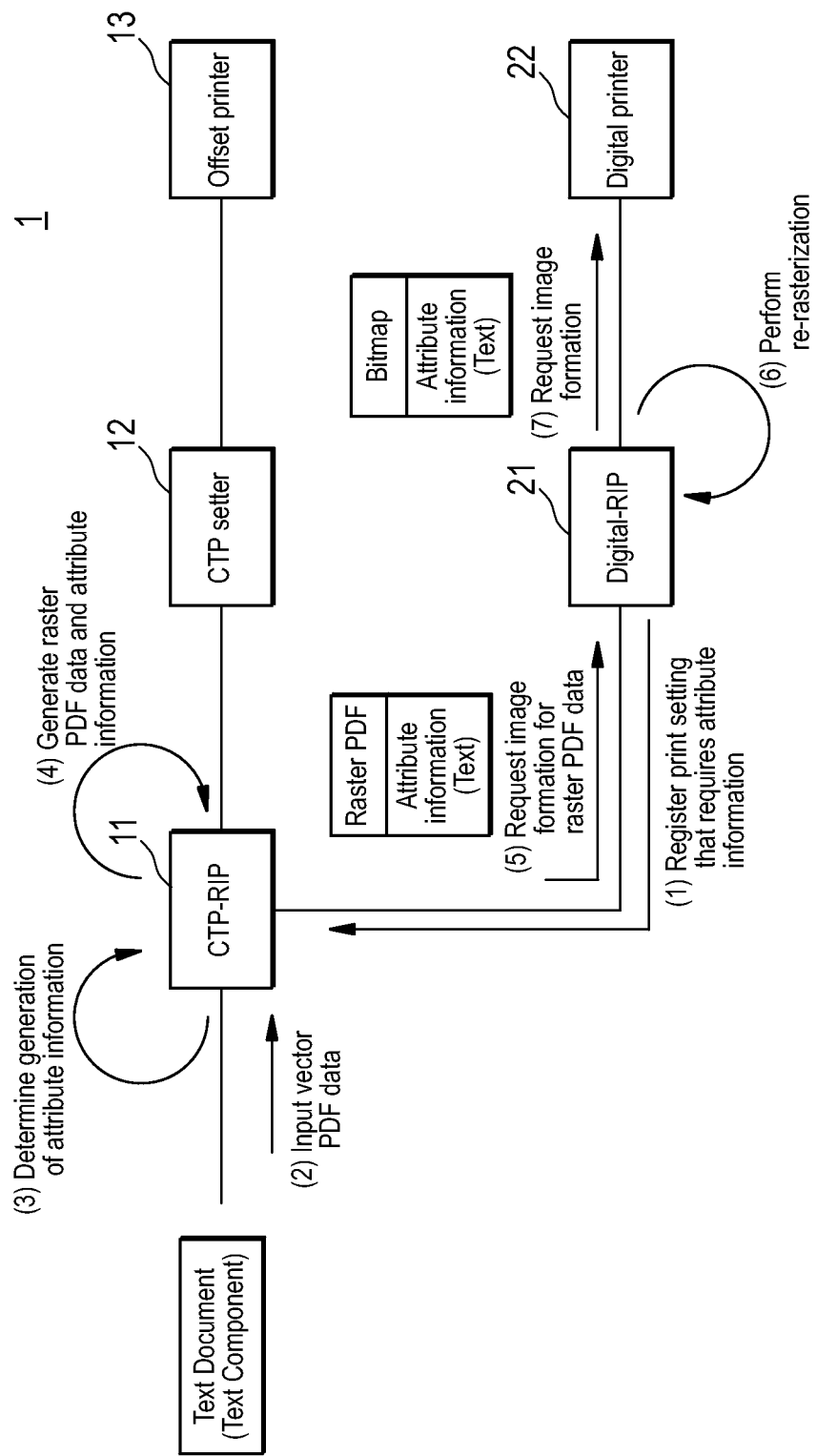
FIG. 3 is a diagram that illustrates a data flow of a case where an image forming is performed by the digital printer in the image forming system according to the first embodiment of the present invention.

FIG. 3 is a diagram that illustrates a data flow of a case where the image forming is performed by the digital printer in the image forming system according to this embodiment.

As illustrated in FIG. 3, in the image forming system 1 according to this embodiment, (1) the print setting using attribute information that is necessary for image formation performed by the digital printer 22 is transmitted from the digital-RIP 21 to the CTP-RIP 11 in advance so as to be registered. In the attribute information that is necessary for the image formation performed by the digital printer 22, the attribute information of the text data and the attribute information of the vector data are included. The attribute information of the image data is not necessary for the image formation performed by the digital printer 22. (2) For example, when the vector PDF data of a text document that includes only a text component is input to the CTP-RIP 11, (3) the CTP-RIP 11 determines whether the attribute information is necessary based on whether or not any one of the print setting of the vector PDF data coincides with the registered print setting and determines the generation of the attribute information by the coincidence. (4) The CTP-RIP 11 generates the raster PDF data that is the image data by performing the rasterization process for the vector PDF data and generates the attribute information based on the vector PDF data when the CTP-RIP 11 determines that the attribute information is to be generated. Since the vector PDF data for which the rasterization process has been performed is the vector PDF data of the text document that includes only the text component, the attribute information generated by the CTP-RIP 11 is the attribute information of the text data. (5) When the digital-RIP 21 is requested to perform image formation of the raster PDF data, by transmitting the raster PDF data and the attribute information, which have been generated, to the digital-RIP 21 by the CTP-RIP 11, (6) the digital-RIP 21 performs the re-rasterization process for the raster PDF data. (7) The digital-RIP 21 transmits both the image data that is bitmap data generated by the re-rasterization process and the attribute information of the text data generated by the CTP-RIP 11 to the digital printer 22, and thereby requests the image formation for the image data based on the print setting and the attribute information.

When the re-rasterization process is performed for the raster PDF data by the digital-RIP 21 in "(6)" described above, the attribute information of the image data is generated based on the raster PDF data that includes only an image component, and the attribute information of the image data is replaced by the attribute information of the text data generated based on the vector PDF data by the CTP-RIP 11. In this way, in "(7)" described above, the attribute information of the text data generated based on the vector PDF data by the CTP-RIP 11 is transmitted to the digital printer 22.

In the image forming system 1 according to this embodiment, the attribute information of the text data or the vector data is transmitted to the digital printer 22 together with the image data, and accordingly, an outline process and the like can be performed for the image data by the digital printer 22. Accordingly, the degradation of the printing quality that may occur due to not performing the outline process and the like can be prevented.

Figure 4:
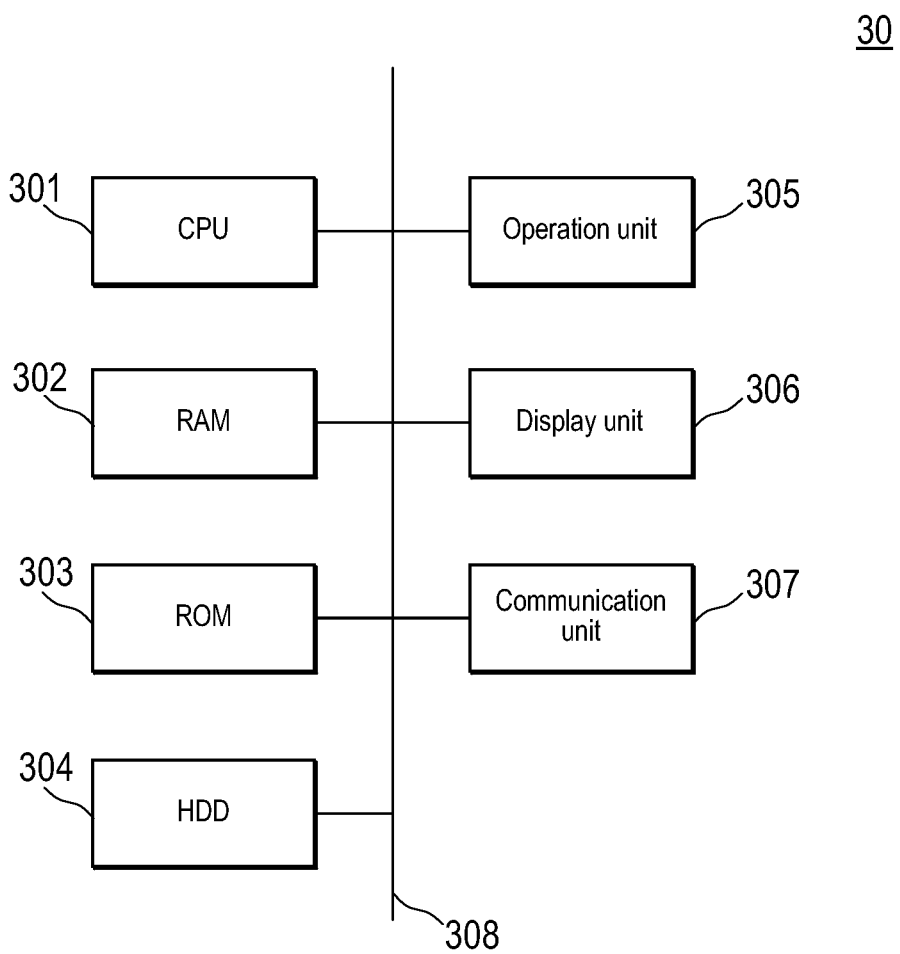
FIG. 4 is a block diagram that illustrates the configuration of a client PC.

FIG. 4 is a block diagram that illustrates the configuration of the client PC of the image forming system according to this embodiment.

As illustrated in FIG. 4, the client PC 30 includes a CPU (Central Processing Unit) 301, a RAM (Random Access Memory) 302, a ROM (Read Only Memory) 303, a HDD (Hard Disk Drive) 304, an operation unit 305, a display unit 306, and a communication unit 307, and these units are interconnected through a bus 308 for exchanging signals.

The CPU 301 controls the above-described units and performs various calculation processes in accordance with programs.

The RAM 302 temporarily stores a program or data as a work area.

The ROM 303 stores various programs and various kinds of data.

The HDD 304 stores an operating system, a printer driver, other various programs, and various kinds of data.

The operation unit 305 includes a pointing device such as a mouse and a keyboard and is used for performing various operations and various inputs.

The display unit 306, for example, is a liquid crystal display and displays various kinds of information.

The communication unit 307 is an interface used for communicating with an external device. As the communication unit 307, a network interface that is in compliance with standards such as Ethernet (registered trademark), SATA (Serial Advanced Technology Attachment), PCI Express, USB, or IEEE 1394, a wireless communication interface such as BLUETOOTH (registered trademark) or IEEE 802.11, a telephone circuit interface used for connecting to a telephone circuit, or the like may be used.

The client PC 30 has the above-described configuration and thereby operates as below.

The CPU 301 causes the printer driver to generate the print job based on a user's instruction and transmits the generated print job from the communication unit 307 to the CTP-RIP 11 of the offset image forming apparatus 10. In this way, the CPU 301 causes the CTP-RIP 11 to unifiedly perform the rasterization process for the print data included in the print job and causes the offset printer 13 or the digital printer 22 of the digital image forming apparatus 20 to form the image on the sheet based on the image data generated by the rasterization process. By causing the CTP-RIP 11 to unifiedly perform the rasterization process for the print data included in the print job, drawing results of the printed images formed by the image forming apparatuses can be uniformized.

Figure 5:
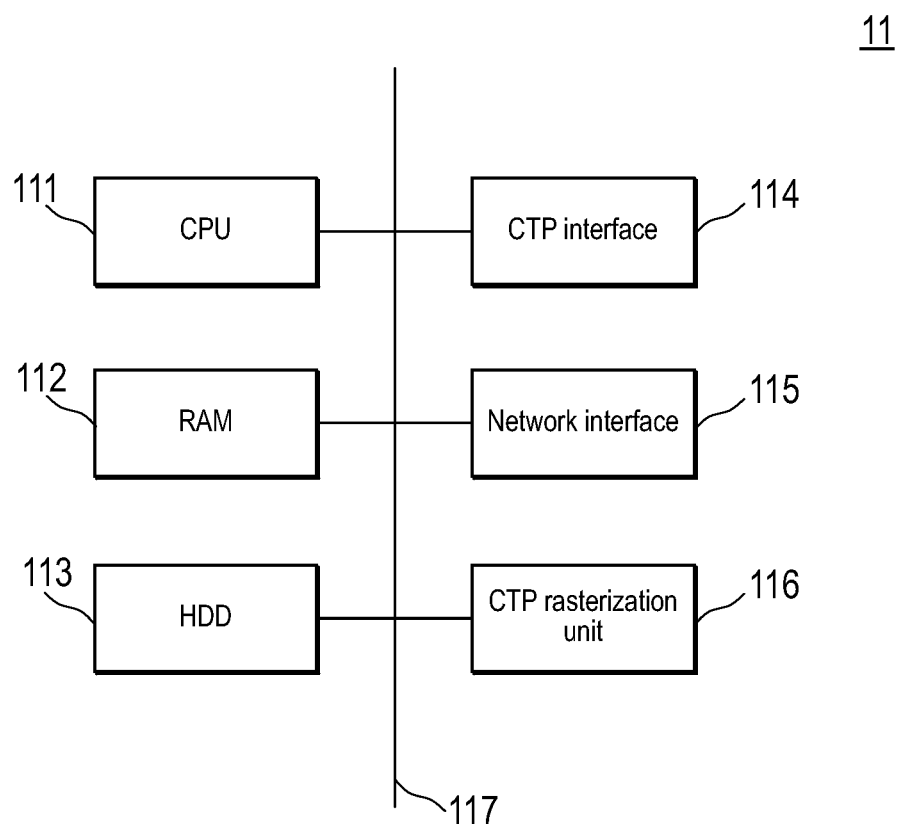
FIG. 5 is a block diagram of a CTP-RIP.

FIG. 5 is a block diagram of the CTP-RIP.

As illustrated in FIG. 5, the CTP-RIP 11 includes a CPU 111, a RAM 112, an HDD 113, a CTP interface 114, a network interface 115, and a CTP rasterization unit 116. These units are interconnected through a bus 117 for exchanging signals.

The CPU 111 configures a determination unit and an attribute information generating unit. The CTP rasterization unit 116 configures a rasterization unit. The CPU 111 and the network interface 115 configure a print job transmitting unit.

The respective functions of the CPU 111, the RAM 112, and the HDD 113 are similar to those of corresponding constituent elements of the client PC 30, and thus, description thereof will not be described.

The CTP interface 114 is an interface for the CTP-RIP 11 to be connected to the CTP setter 12 by a dedicated line. The image data generated by performing the rasterization process for the print data by the CTP rasterization unit 116 is transmitted from the CTP interface 114 to the CTP setter 12. By connecting the CTP-RIP 11 and the CTP setter 12 together using a dedicated line, the transmission speed of the image data can be improved.

The network interface 115 is an interface for connecting to the network 40. The CTP-RIP 11 is connected to the digital image forming apparatus 20 and the client PC 30 through the network 40, and transmits and receives various kinds of data.

The CTP rasterization unit 116 performs the rasterization process of the print data included in the print job.

The CTP-RIP 11 has the configuration described above and thereby operates as below.

The CPU 111 receives the print settings, which use the attribute information that is necessary for image formation performed by the digital printer 22, from the digital-RIP 21 in the network interface 115 and stores the received print settings in the HDD 113 so as to be registered in advance.

The CPU 111 determines whether or not one of print settings included in the print job received from the client PC 30 in the network interface 115 coincides with the print setting stored in the HDD 113 so as to be registered in advance. Then, when the CPU 111 determines that one of the print settings included in the print job coincides with the print setting registered in advance, the CPU 111 generates the attribute information based on the print data.

The CPU 111 causes the CTP rasterization unit 116 to perform the rasterization process for the print data that is included in the print job received from the client PC 30.

The CPU 111 transmits the image data generated by the rasterization process of the print data, which is performed by the CTP rasterization unit 116, the print setting, and the generated attribute information to the digital printer 22 through the digital-RIP 21 of the digital image forming apparatus 20. The re-rasterization process is performed for the image data by the digital-RIP 21, and then, the image data is transmitted to the digital printer 22. In this way, the CPU 111 causes the digital printer 22 to perform image forming for the image data to be transmitted based on the print setting and the attribute information.

Figure 6:
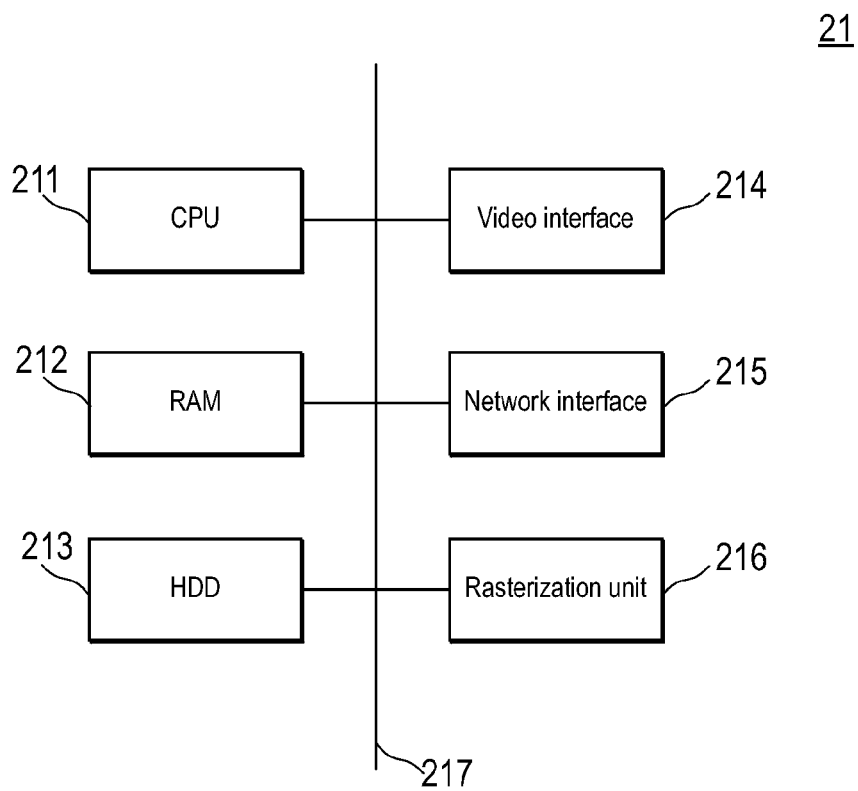
FIG. 6 is a block diagram of a digital-RIP.

FIG. 6 is a block diagram of the digital-RIP.

As illustrated in FIG. 6, the digital-RIP 21 includes a CPU 211, a RAM 212, an HDD 213, a video interface 214, a network interface 215, and a rasterization unit 216. These units are interconnected through a bus 217 for exchanging signals.

The CPU 211 and the network interface 215 configure a registration unit.

The respective functions of the CPU 211, the RAM 212, and the HDD 213 are similar to those of corresponding constituent elements of the client PC 30, and thus, description thereof will not be described.

The video interface 214 is an interface for connecting to the digital printer 22 using a dedicated line. The image data that has been re-rasterized by the rasterization unit 216 is transmitted from the video interface 214 to the digital printer 22 using a dedicated line, so that the transmission speed of the image data can be improved.

The network interface 215 is an interface for connecting to the network 40. The digital-RIP 21 is connected to the offset image forming apparatus 10 and the client PC 30 through the network 40, and transmits and receives various kinds of data.

The rasterization unit 216 performs the re-rasterization process for the image data generated by the rasterization process for the print data, which is performed by the CTP-RIP 11, so as to convert the generated image data into image data that can be used for image formation by the digital printer 22.

The digital-RIP 21 has the configuration described above and thereby operates as below.

The CPU 211 transmits the print setting using the attribute information that is necessary for image formation performed by the digital printer 22 from the network interface 215 to the CTP-RIP 11, and thereby registers the print setting in the CTP-RIP 11.

The CPU 211 receives the image data, the print setting, and the attribute information from the CTP-RIP 11 in the network interface 215. The CPU 211 performs the re-rasterization process for the received image data so as to convert the received image data into the image data that can be used for image formation by the digital printer 22. The CPU 211 transmits the image data converted by the re-rasterization process to the digital printer 22 together with the print setting and the attribute information received from the CTP-RIP 11. Then, the CPU 211 causes the digital printer 22 to perform image forming for the image data to be transmitted based on the print setting and the attribute information.

Figure 7:
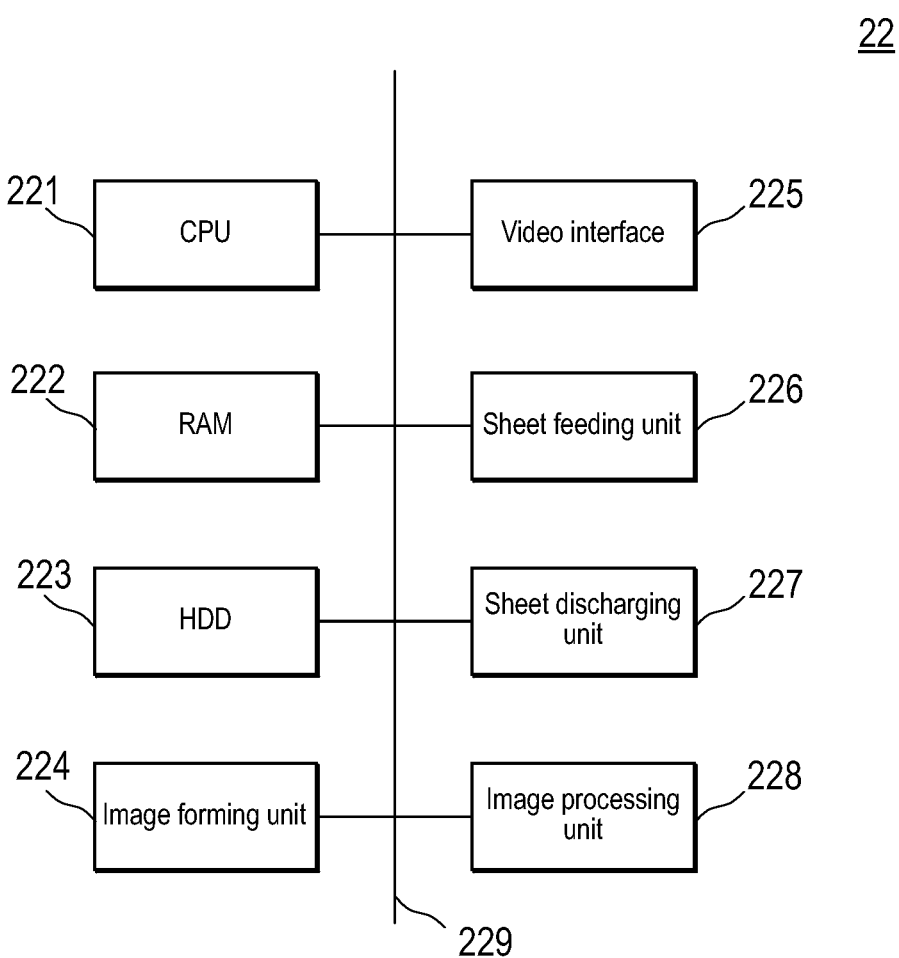
FIG. 7 is a block diagram of the digital printer.

FIG. 7 is a block diagram of the digital printer.

As illustrated in FIG. 7, the digital printer 22 includes a CPU 221, a RAM 222, an HDD 223, an image forming unit 224, a video interface 225, a sheet feeding unit 226, a sheet discharging unit 227, and an image processing unit 228. These units are interconnected through a bus 229 for exchanging signals.

The CPU 221 and the video interface 225 configure a print job reception unit, and the image forming unit 224 configures an image forming unit.

The respective functions of the CPU 221, the RAM 222, and the HDD 223 are similar to those of corresponding constituent elements of the client PC 30, and thus, description thereof will not be described.

The video interface 225 is an interface for connecting to the digital-RIP 21 using the dedicated line. The image data that has been re-rasterized by the digital-RIP 21 is received in the video interface 225 through the dedicated line.

The image processing unit 228 performs a process for image formation for the image data based on the print setting and the attribute information. For example, in a case where there is a setting for contour enhancement of text data in the print setting, a process for contour enhancement is performed for a portion having the attribute information of the text in the image data.

The image forming unit 224 performs image forming on the sheet based on the image data, through processes of charge, exposure, development, transfer, and fixing by using an electrographic method based on the image data processed by the image processing unit 228.

The sheet feeding unit 226 supplies the sheet used for image formation by the image forming unit 224.

The sheet discharging unit 227 discharges the sheet on which the image forming has been performed by the image forming unit 224.

The digital printer 22 has the configuration described above and thereby operates as below.

The CPU 221 receives in the video interface 225 the image data that has been re-rasterized by the digital-RIP 21 and the print setting of the image data from the digital-RIP 21. In addition, the CPU 221 receives the attribute information generated by the CTP-RIP 11 from the digital-RIP 21 in the video interface 225. The CPU 221 causes the image processing unit 228 to perform the process for image forming for the received image data based on the print setting and the attribute information, and causes the image forming unit 224 to perform image forming of the image based on the image data on the sheet.

Figure 8:
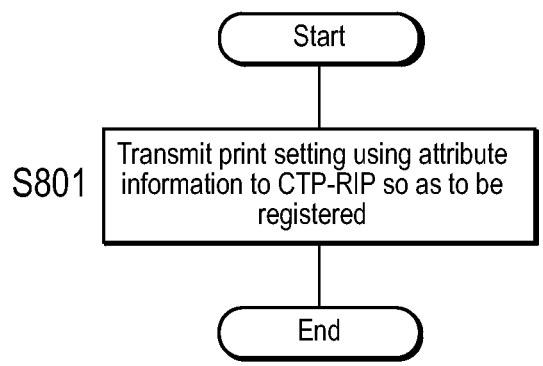
FIG. 8 is a flowchart for registering a print setting using attribute information from the digital-RIP to the CTP-RIP.

FIG. 8 is a flowchart for registering the print setting using attribute information from the digital-RIP to the CTP-RIP. This flowchart, for example, may be performed by a program executed by the digital-RIP 21.

The CPU 211 of the digital-RIP 21 transmits the print setting using the attribute information that is necessary for image formation performed by the digital printer 22 to the CTP-RIP 11, and thereby registers the attribute information (S801).

For example, in a case where the digital printer can perform the contour processing for the contour enhancement of a portion, which has the attribute of the text data, of the image data, the CPU 211 registers the print setting of the contour processing for the contour enhancement in the CTP-RIP 11 as the print setting using the attribute information of the text data that is necessary for the image formation performed by the digital printer 22.

In a case where there is a plurality of the digital image forming apparatuses 20, the print setting using the attribute information may be registered in the CTP-RIP 11 for each digital image forming apparatus in correspondence with the process for the image formation performed by the digital printer of each digital image forming apparatus.

Figure 9:
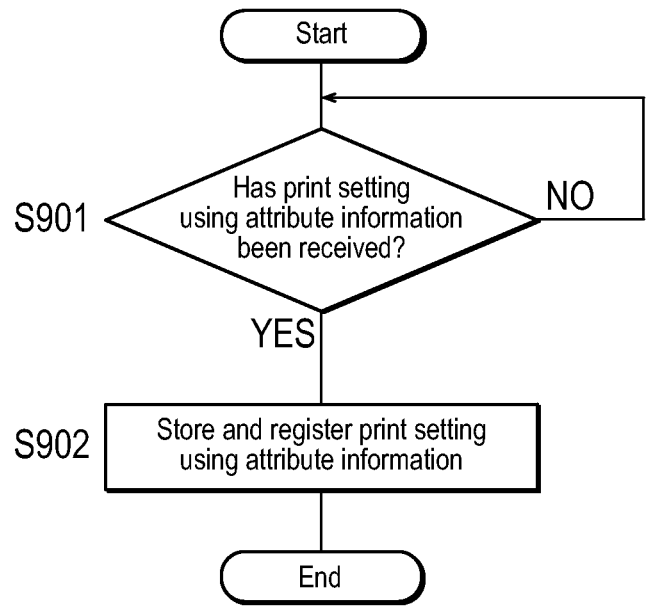
FIG. 9 is a flowchart for registering the print setting in the CTP-RIP when the print setting using attribute information is transmitted from the digital-RIP to the CTP-RIP.

FIG. 9 is a flowchart for registering the print setting in the CTP-RIP when the print setting using the attribute information is transmitted from the digital-RIP to the CTP-RIP. This flowchart, for example, may be performed by a program executed by the CTP-RIP 11.

The CPU 111 of the CTP-RIP 11 waits for the reception of the print setting using the attribute information, which is transmitted from the digital-RIP 21, in the network interface 115 (No in S901). When the CPU 111 receives the print setting (Yes in S901), the CPU11 registers the received print setting by storing in the HDD 113 (S902).

Figure 10:
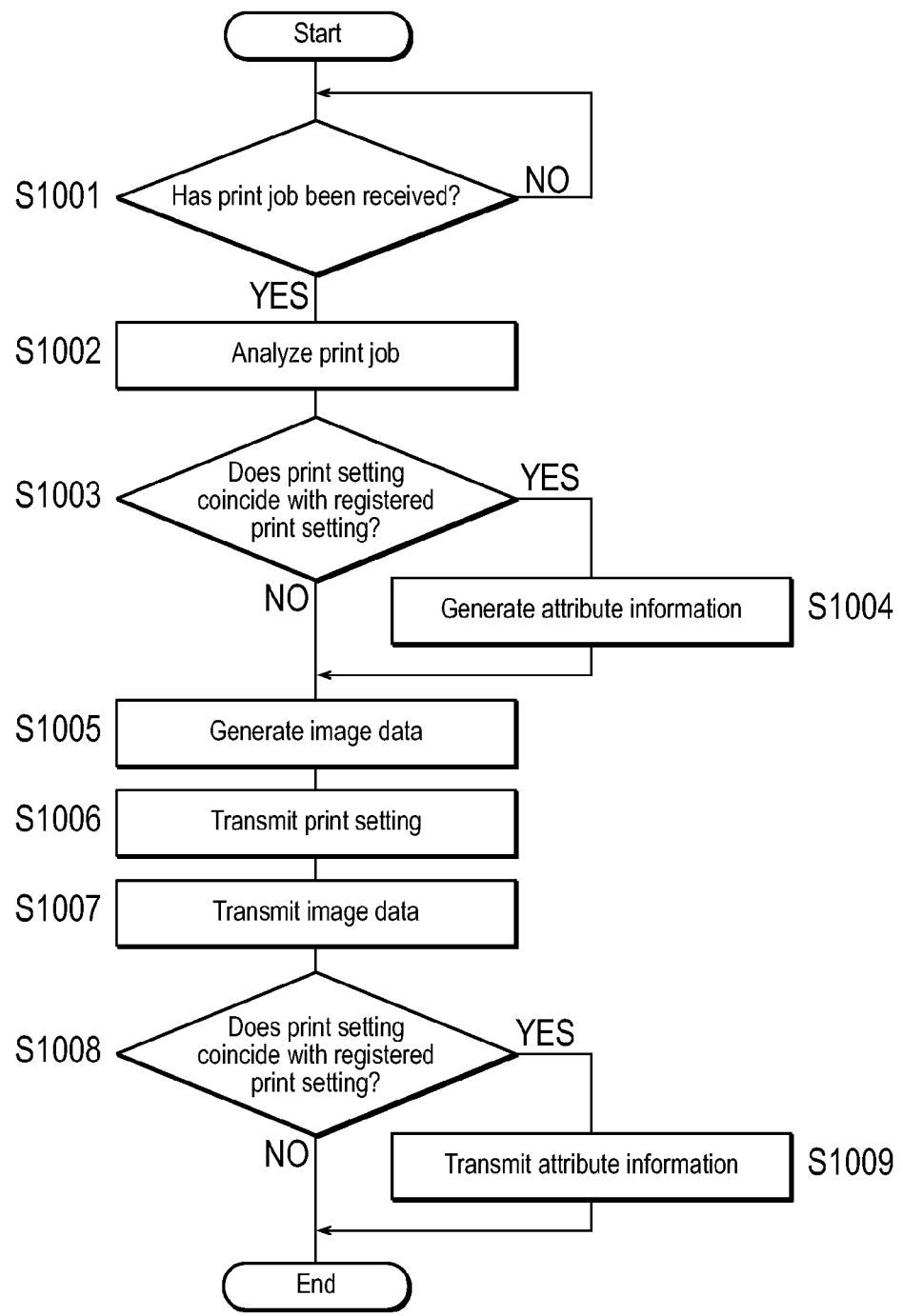
FIG. 10 is a flowchart for processing a print job by the CTP-RIP.

FIG. 10 is a flowchart for processing the print job by the CTP-RIP. This flowchart, for example, may be performed by a program executed by the CTP-RIP 11.

The CPU 111 of the CTP-RIP 11 waits for the reception of the print job, which is transmitted from the client PC 30, in the network interface 115 (No in S1001). When the CPU 11 receives the print job (Yes in S1001), the CPU 111 analyzes the print job (S1002). The CPU 111 recognizes the print data and the print setting included in the print job by analyzing the print job.

The CPU 111 determines whether or not any one of the print settings included in the print job coincides with the registered print setting (S1003).

When the CPU 111 determines that any one of the print settings included in the print job coincides with the registered print setting (Yes in S1003), the CPU 111 generates the attribute information based on the print data (S1004).

The CPU 111 performs the rasterization process for the print data by the CTP rasterization unit 116 and thereby generates the image data (S1005).

Then, the CPU 111 transmits the print setting and the image data to the digital-RIP 21 (S1006 and S1007). When the CPU 111 determines that any one of the print settings included in the print job coincides with the registered print setting in Step S1003 (Yes in S1008), the CPU 111 transmits the attribute information to the digital-RIP 21 (S1009).

Figure 11:
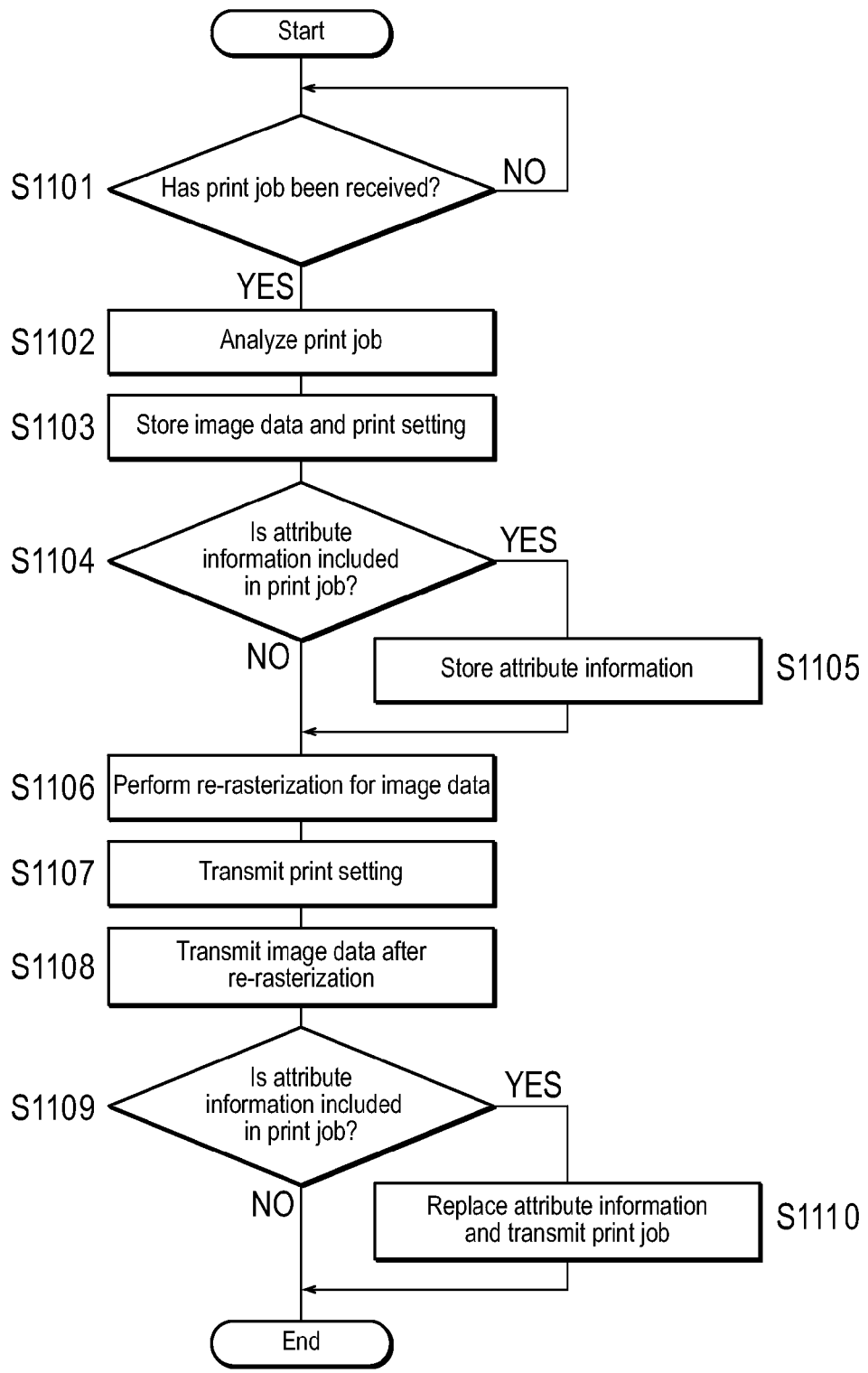
FIG. 11 is a flowchart for processing the print job by the digital-RIP.

FIG. 11 is a flowchart for processing the print job by the digital-RIP. This flowchart, for example, may be performed by a program executed by the digital-RIP 21.

The CPU 211 of the digital-RIP 21 waits for the reception of the print job, which is transmitted from the CTP-RIP 11, in the network interface 215 (No in S1101). When the CPU 211 receives the print job (Yes in S1101), the CPU 211 analyzes the print job (S1102). The CPU 211 recognizes the print data, the print setting, and the attribute information included in the print job by analyzing the print job.

The CPU 211 stores the image data and the print setting included in the print job in the HDD 213 (S1103) and, when the attribute information is included in the print job (Yes in S1104), stores the attribute information in the RAM 212 (S1105).

The CPU 211 performs the re-rasterization process of the image data by the rasterization unit 216 for converting the image data into image data that can be used for the image formation by the digital printer 22 (S1106).

Then, the CPU 211 transmits the print setting and the image data that has been processed to be re-rasterized from the video interface 214 to the digital printer 22 (S1107 and S1108). When the attribute information is included in the print job (Yes in S1109), the CPU 211 replaces the attribute information of the image data, which is generated in the re-rasterization process, by the attribute information included in the print job and transmits the print job to the digital printer 22 from the video interface 214 in (S1110). In this way, the print job including the re-rasterized image data, the print setting, and the attribute information generated by the CTP-RIP 11 is transmitted from the digital-RIP 21 to the digital printer 22.

Accordingly, the digital-RIP 21 can perform the outline process and the like using the attribute information of text data that is generated based on the vector PDF data by the CTP-RIP 11, and thereby the degradation of the printing quality of a portion of the text data can be prevented.

In addition, It is no need to be performed the rasterization process of the print data by the digital-RIP 21 because the outline process and the like using the attribute information of the text data is performed by the digital printer, and accordingly, the rasterization process of the vector PDF data can be unifiedly performed by the CTP-RIP. Therefore, a problem that the drawing result varies by changing the RIP performing the rasterization process can be solved.

This embodiment has the following effects.

In the image forming system including a plurality of image forming apparatuses, when the print setting of the print data used for performing image forming by the first image forming apparatus is determined to coincide with the print setting registered in advance as the print setting using attribute information that is necessary for performing image forming by the first image forming apparatus, the second image forming apparatus is caused to generate the attribute information based on the print data. Then, the generated attribute information is transmitted to the first image forming apparatus together with the image data generated through the rasterization process of the print data by the second image forming apparatus and the print setting, and the first image forming apparatus is caused to perform image forming for the image data based on the print setting and the attribute information. In this way, by using the attribute information that is necessary for the process of performing image forming by the image forming apparatus for the image data generated by the rasterization process performed by another image forming apparatus, an outline process, thinning, contour enhancement, and the like can be performed. In this way, while the identity of the original image included in the image data is maintained, the degradation of the printing quality of a text and graphic portion of the image data is prevented, and, variations in the drawing results can be prevented by enabling the unification of the rasterization process by one processing unit.

In addition, by setting the text data, the vector data, and the image data as the attribute information influencing the image formation of the printer of the first image forming apparatus, the degradation of the printing quality can be prevented more efficiently.

Furthermore, by setting any one of thinning, an outline process, and contour enhancement as the image formation based on the attribute information in the printer of the first image forming apparatus, the degradation of the image quality can be prevented more efficiently.

In addition, in the image forming system including a plurality of the first image forming apparatuses, the print setting registered by the registration unit is set to the print setting using the attribute information that is necessary for the image formation performed by the printer of each of the first image forming apparatuses and is registered in correspondence with the process of the image formation performed by the printer of each of the first image forming apparatuses for each of the first image forming apparatuses. In this way, also in the image forming system including a plurality of the first image forming apparatuses, the degradation of the printing quality of each of the first image forming apparatuses can be prevented more efficiently in a flexible manner.

Furthermore, image data received from the processing unit of the first image forming apparatus to the printer of the first image forming apparatus is configured as image data converted into image data that can be used for image formation in the image forming unit of the first image forming apparatus through the re-rasterization process performed further by the processing unit of the first image forming apparatus for the image data generated by the rasterization process performed by the rasterization unit of the second image forming apparatus. In this way, the degradation of the printing quality can be prevented in accordance with the specification of each processing unit in a more flexible manner.

Second Embodiment

An image forming method, a non-transitory computer readable storage medium stored with a program for an image forming system, and an image forming system according to a second embodiment of the present invention will be described in detail. Points of this embodiment that are different from those of the first embodiment are as follows. According to the first embodiment, the print setting using the attribute information that is necessary for the image formation performed by the digital printer 22 is registered in the CTP-RIP 11 in advance, and, when the registered print setting and the print setting of the print job coincide with each other, the attribute information is generated by the CTP-RIP 11. On the other hand, according to this embodiment, when the digital-RIP 21 receives the print job, the digital-RIP 21 requests the attribute information that is necessary for the image formation based on the print setting by the digital printer 22 from the CTP-RIP 11 and causes the CTP-RIP 11 to generate the attribute information. The other points of this embodiment are similar to those of the first embodiment, and thus, duplicate description will be simplified or will not be described.

The CPU 211 of the digital-RIP 21 and the network interface 215 configure an image data reception unit and an attribute information reception unit, and the CPU 211 configures an analysis unit and a request unit. The CTP rasterization unit 116 of the CTP-RIP 11 configures a rasterization unit, and the CPU 111 configures an attribute information generating unit. The CPU 111 and the network interface 115 configure an image data transmitting unit and an attribute information transmitting unit. The CPU 221 and the video interface 225 of the digital printer 22 configure a print job reception unit, and the image forming unit 224 configures an image forming unit.

Figure 12:
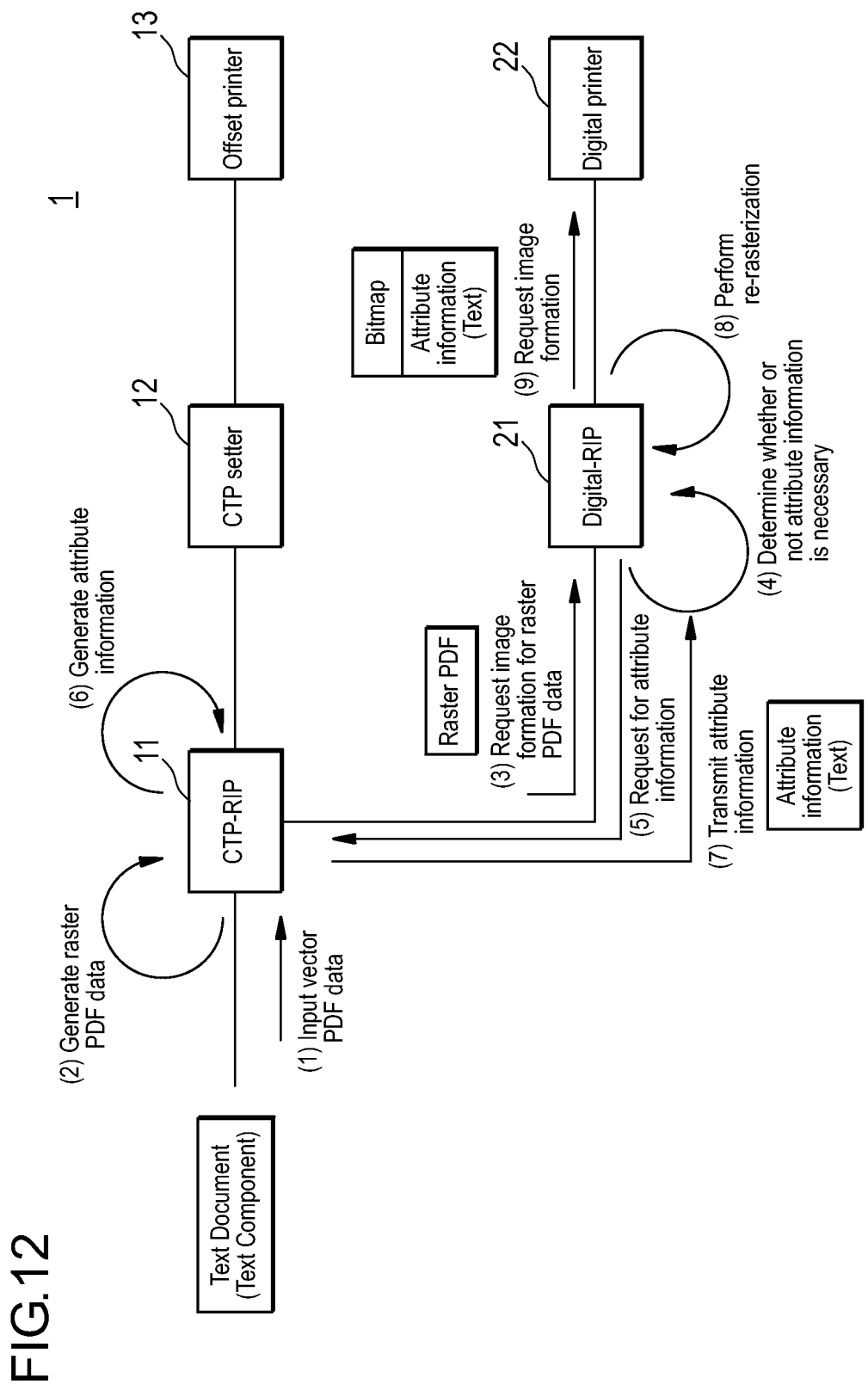
FIG. 12 is a diagram that illustrates a data flow of a case where an image forming is performed by the digital printer in an image forming system according to a second embodiment of the present invention.

FIG. 12 is a diagram that illustrates a data flow of a case where the image forming is performed by the digital printer in the image forming system according to this embodiment.

As illustrated in FIG. 12, in the image forming system 1 according to this embodiment, (1) for example, when the vector PDF data of the text document including only a text component is input to the CTP-RIP 11, (2) the rasterization process is performed for the vector PDF data by the CTP-RIP 11 so as to generate the raster PDF data that is image data. (3) When image formation for the raster PDF data is requested to the digital-RIP 21 by transmitting the generated raster PDF data to the digital-RIP 21 by the CTP-RIP 11, (4) the digital-RIP 21 analyzes and determines whether or not attribute information is necessary for the image formation based on a print setting included in the raster PDF data. (5) When the digital-RIP 21 determines that the attribute information is necessary, the digital-RIP 21 requests the attribute information from the CTP-RIP 11, (6) the CTP-RIP generates the attribute information, and (7) the digital-RIP 21 receives the attribute information transmitted by the CTP-RIP 11. (8) The digital-RIP 21 generates the image data that is bitmap data by performing the re-rasterization process for the raster PDF data, and, (9) by transmitting the generated image data to the digital printer 22 together with the attribute information generated by the CTP-RIP 11, the digital-RIP 21 requests the image formation for the image data based on the print setting and the attribute information.

In "(4)" described above, the analysis of whether or not the attribute information is necessary for the image formation based on the print setting included in the raster PDF data is performed as follows. For example, in a case where the contour process of the contour enhancement is set to be performed for text data in the print setting, the attribute information of the text data is required, so that the digital-RIP 21 analyzes that the attribute information is necessary.

In the image forming system 1 according to this embodiment, the attribute information of the text data is transmitted to the digital printer 22 together with the image data, and accordingly, the outline process and the like can be performed for the image data by the digital printer 22. Accordingly, similar to the first embodiment, the degradation of the printing quality that may occur due to not performing of the outline process and the like can be prevented.

Figure 13:
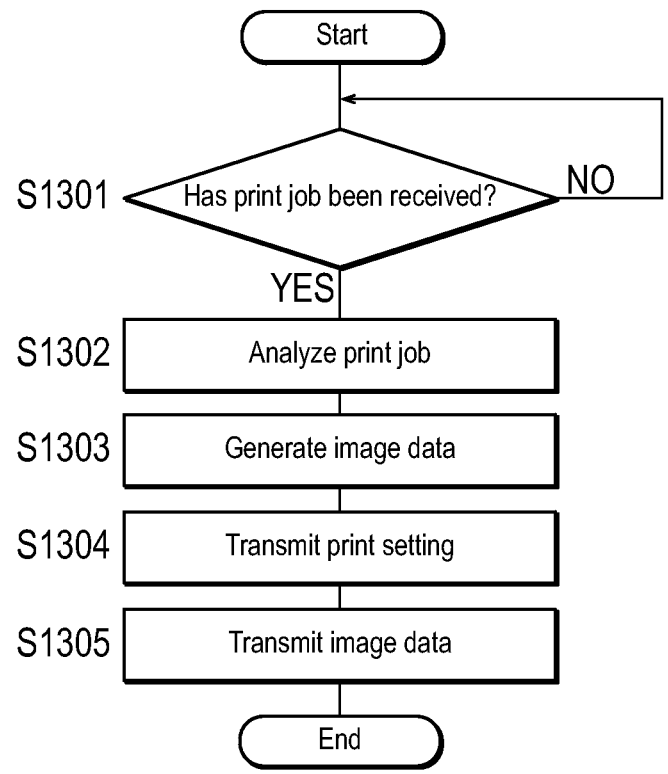
FIG. 13 is a flowchart for processing the print job by the CTP-RIP.

FIG. 13 is a flowchart for processing the print job by the CTP-RIP. The process of this flowchart, for example, may be performed by a program executed by the CTP-RIP 11.

The CPU 111 of the CTP-RIP 11 waits for the reception of the print job, which is transmitted from the client PC 30, in the network interface 115 (No in S1301). When the CPU 11 receives the print job (Yes in S1301), the CPU 111 analyzes the print job (S1302). The CPU 111 recognizes the print data and the print setting included in the print job by analyzing the print job.

The CPU 111 generates the image data by performing the rasterization process for the print data by the CTP rasterization unit 116 (S1303).

Next, the CPU 111 transmits the print setting and the generated image data to the digital-RIP 21 (S1304 and S1305).

Figure 14:
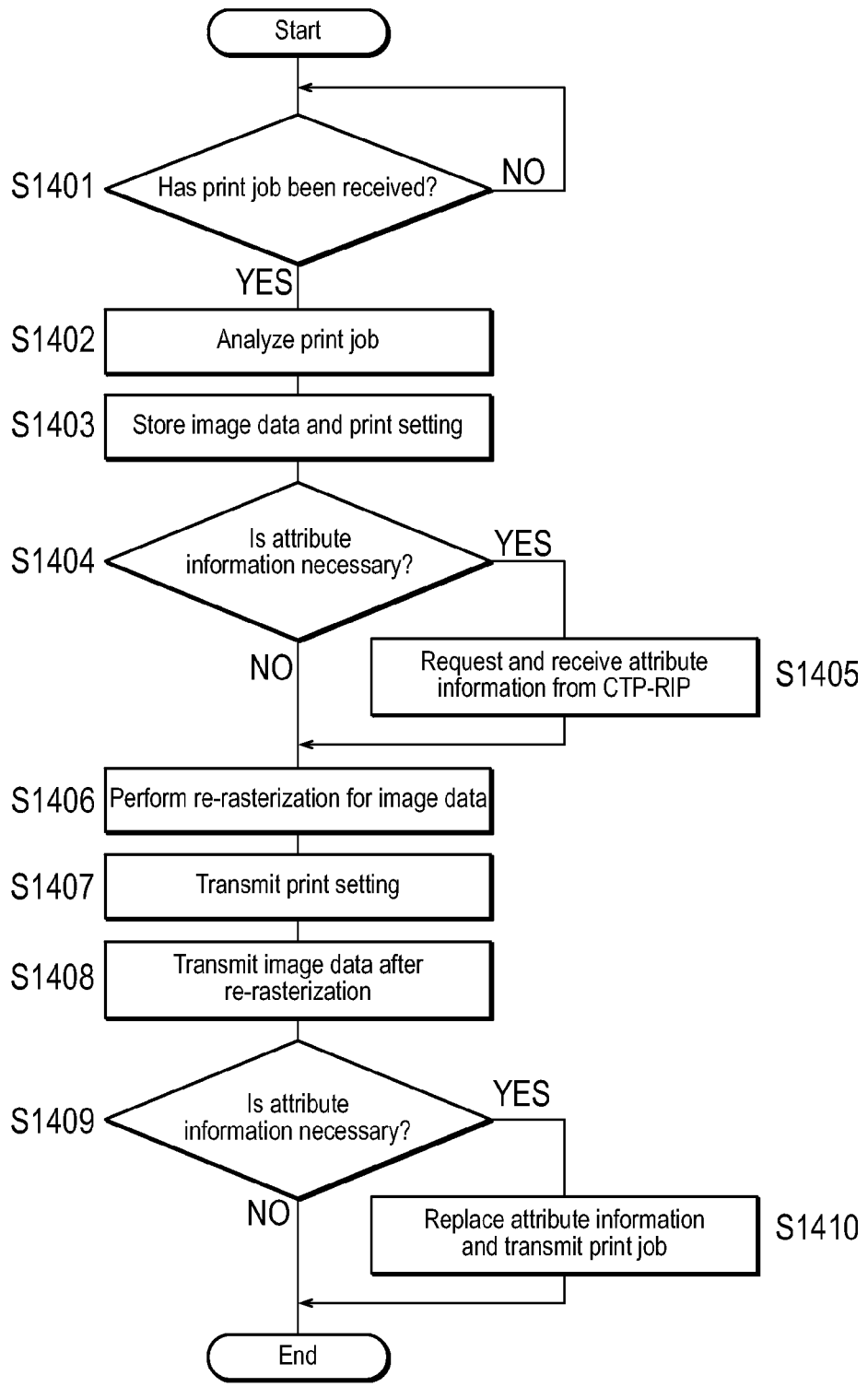
FIG. 14 is a flowchart for processing the print job by the digital-RIP.

FIG. 14 is a flowchart for processing the print job by the digital-RIP. This flowchart, for example, may be performed by a program executed by the digital-RIP 21.

The CPU 211 of the digital-RIP 21 waits for the reception of the print job, which is transmitted from the CTP-RIP 11, in the network interface 215 (No in S1401). When the CPU 211 receives the print job (Yes in S1401), the CPU 211 analyzes the print job (S1402). The CPU 211 recognizes the image data and the print setting included in the print job by analyzing the print job.

The CPU 211 stores the image data and the print setting included in the print job in the HDD 213 (S1403).

The CPU 211 determines by the analysis whether or not the attribute information is necessary for image formation based on the print setting (S1404). When the CPU 211 determines that the attribute information is necessary (Yes in S1404), the CPU 211 requests the attribute information from the CTP-RIP 11 and receives the attribute information generated by the CTP-RIP 11 (S1405).

The CPU 211 performs the re-rasterization process for the image data so as to convert the image data into image data that can be used for image formation by the digital printer 22, by the rasterization unit 216 (S1406).

Then, the CPU 211 transmits the print setting and the image data for which the re-rasterization process has been performed from the video interface 214 to the digital printer 22 (S1407 and S1408) In addition, when it is determined that the attribute information is necessary in Step S1405 (Yes in S1409), the CPU 211 replaces the attribute information of the image generated in the re-rasterization process by the attribute information received in Step S1405 and transmits the print job from the video interface 214 to the digital printer 22 (S1410). In this way, the print job including the re-rasterized image data, the print setting, and the attribute information generated by the CTP-RIP 11 is transmitted from the digital-RIP 21 to the digital printer 22.

Figure 15:
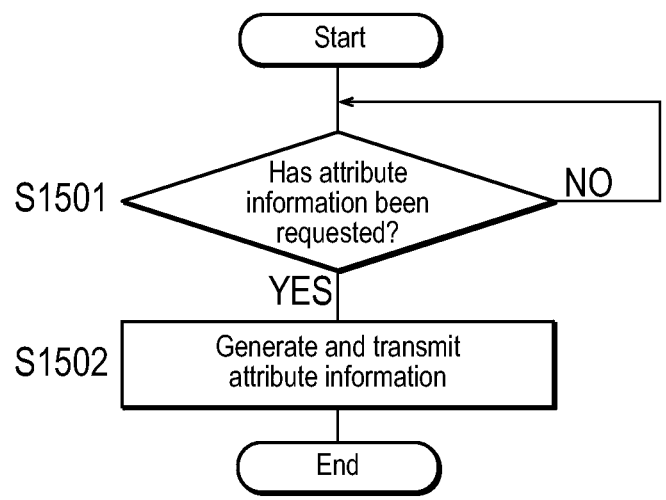
FIG. 15 is a flowchart for generating attribute information in the CTP-RIP when the attribute information is requested from the digital-RIP to the CTP-RIP.

FIG. 15 is a flowchart for generating the attribute information in the CTP-RIP when the attribute information is requested from the digital-RIP to the CTP-RIP. This flowchart, for example, may be performed by a program executed by the CTP-RIP 11.

The CPU 111 of the CTP-RIP 11 waits for the reception of an attribute information request, which is transmitted from the digital-RIP 21, in the network interface 115 (No in S1501). When the CPU 111 receives the attribute information request (Yes in S1501), the CPU 111 generates the attribute information based on the vector PDF data that is the print data and transmits the generated attribute information to the digital-RIP 21 (S1502).

This embodiment has the following effect.

In the image forming system including a plurality of image forming apparatuses, when it is determined that the attribute information is necessary for the image formation based on the print setting of the print job by the first image forming apparatus, the second image forming apparatus is caused to generate the attribute information based on the print data of the print job in accordance with the request from the first image forming apparatus, and transmit the generated attribute information to the first image forming apparatus. Then, the first image forming apparatus is caused to perform image forming for the image data based on the print setting of the print job and the attribute information generated by the second image forming apparatus. In this way, by using the attribute information that is necessary for the process of image forming by the image forming apparatus for the image data generated by the rasterization process performed by another image forming apparatus, the outline process and the like can be performed. In this way, while the identity of the original image included in the image data is maintained, the degradation of the printing quality of a text and graphic portion of the image data is prevented, and, variations in the drawing results can be prevented by enabling the unification of the rasterization process according to one processing unit.

As above, the image forming method, the non-transitory computer readable storage medium stored with a program for the image forming system, and the image forming system according to the embodiments of the present invention have been described, however, the present invention is not limited thereto.

For example, some or all of the functions realized by the program in the above-described embodiment may be replaced by hardware such as a circuit.

What is claimed is:

1. An image forming method using an image forming system that includes a plurality of image forming apparatuses each including a processing unit configured to perform a rasterization process of print data and an image forming unit configured to perform image formation on a sheet based on image data generated by rasterization process performed by said processing unit, the image forming method comprising steps of:
   (a) registering a print setting using attribute information that is necessary for the image formation performed by an image forming unit of a first image forming apparatus in a processing unit of a second image forming apparatus in advance;
   (b) determining whether or not any one of print settings of the print data coincides with the print setting registered in said step (a) when the rasterization process of the print data is performed by the processing unit of said second image forming apparatus;
   (c) causing the processing unit of said second image forming apparatus to generate the attribute information based on the print data when any one of the print settings of the print data is determined to coincide with the print setting registered in said step (a) in said step (b);
   (d) causing the processing unit of said second image forming apparatus to transmit the attribute information generated in said step (c) to the image forming unit of said first image forming apparatus through the processing unit of said first image forming apparatus together with the image data generated by the rasterization process performed by the processing unit of said second image forming apparatus and the print settings of the image data;
   (e) causing the image forming unit of said first image forming apparatus to receive the image data, the print settings, and the attribute information transmitted in said step (d) to said image forming unit of said first image forming apparatus through the processing unit of said first image forming apparatus; and
   (f) causing the image forming unit of said first image forming apparatus to perform the image formation for the image data received in said step (e) based on the print settings and the attribute information received in said step (e).

2. The image forming method as claimed in claim 1, wherein the attribute information is information that represents at least one of text data, vector data, and image data.

3. The image forming method as claimed in claim 1, wherein, in the image formation performed by the image forming unit of said first image forming apparatus based on the print settings and the attribute information, at least one of thinning, an outline process, and contour enhancement is performed.

4. The image forming method as claimed in claim 1, wherein said image forming system includes a plurality of said first image forming apparatuses, and the print setting registered in said step (a) is the print setting using the attribute information that is necessary for the image formation performed by the image forming unit of each of said first image forming apparatuses and is registered for each of said first image forming apparatuses in correspondence with a process of the image formation performed by the image forming unit of each of said first image forming apparatuses.

5. The image forming method as claimed in claim 1, wherein the image data transmitted from the processing unit of said first image forming apparatus to the image forming unit of said first image forming apparatus is image data that is converted into image data, which can be used for the image formation performed by the image forming unit of said first image forming apparatus, by further performing a re-rasterization process by the processing unit of said first image forming apparatus for the image data generated by performing the rasterization process by the processing unit of said second image forming apparatus.

6. A non-transitory computer readable storage medium stored with a program, said program causing an image forming system that includes a plurality of image forming apparatuses each including a processing unit configured to perform a rasterization process of print data and an image forming unit configured to perform image formation on a sheet based on image data generated by said rasterization process performed by said processing unit to execute a process comprising processes of:
   (a) registering a print setting using attribute information that is necessary for the image formation performed by an image forming unit of a first image forming apparatus in a processing unit of a second image forming apparatus in advance;
   (b) determining whether or not any one of print settings of the print data coincides with the print setting registered in said process (a) when the rasterization process of the print data is performed by the processing unit of said second image forming apparatus;
   (c) causing the processing unit of said second image forming apparatus to generate the attribute information based on the print data when any one of the print settings of the print data is determined to coincide with the print setting registered in said process (a) in said process (b);
   (d) causing the processing unit of said second image forming apparatus to transmit the attribute information generated in said process (c) to the image forming unit of said first image forming apparatus through the processing unit of said first image forming apparatus together with the image data generated by the rasterization process performed by the processing unit of said second image forming apparatus and the print settings of the image data;
   (e) causing the image forming unit of said first image forming apparatus to receive the image data, said print settings, and the attribute information transmitted in said process (d) to said image forming unit of said first image forming apparatus through the processing unit of said first image forming apparatus; and
   (f) causing the image forming unit of said first image forming apparatus to perform the image formation for the image data received in said process (e) based on the print settings and said attribute information received in said process (e).

7. The non-transitory computer readable storage medium as claimed in claim 6, wherein the attribute information is information that represents at least one of text data, vector data, and image data.

8. The non-transitory computer readable storage medium as claimed in claim 6, wherein, in the image formation performed by the image forming unit of said first image forming apparatus based on said print settings and said attribute information, at least one of thinning, an outline process, and contour enhancement is performed.

9. The non-transitory computer readable storage medium as claimed in claim 6, wherein said image forming system includes a plurality of said first image forming apparatuses, and the print setting registered in said process (a) is the print setting using the attribute information that is necessary for the image formation performed by the image forming unit of each of said first image forming apparatuses and is registered for each of said first image forming apparatuses in correspondence with a process of the image formation performed by the image forming unit of each of said first image forming apparatuses.

10. The non-transitory computer readable storage medium as claimed in claim 6, wherein the image data transmitted from the processing unit of said first image forming apparatus to the image forming unit of said first image forming apparatus is image data that is converted into image data, which can be used for the image formation performed by the image forming unit of said first image forming apparatus, by further performing a re-rasterization process by the processing unit of said first image forming apparatus for the image data generated by performing the rasterization process by the processing unit of said second image forming apparatus.

11. An image forming system comprising a plurality of image forming apparatuses each including a processing unit configured to perform a rasterization process of print data and an image forming unit configured to perform image formation on a sheet based on image data generated by the rasterization process performed by said processing unit,
wherein a processing unit of a first image forming apparatus includes a registration unit configured to register a print setting using attribute information that is necessary for the image formation performed by the image forming unit of said first image forming apparatus in a processing unit of a second image forming apparatus in advance,
wherein the processing unit of said second image forming apparatus includes:
a determination unit configured to determine whether or not any one of the print settings of the print data coincides with the print setting registered by said registration unit when the rasterization process of the print data is performed;
an attribute information generating unit configured to generate the attribute information based on the print data when any one of the print settings of the print data is determined to coincide with the print setting registered by said registration unit by said determination unit;
a rasterization unit configured to generate the image data by performing the rasterization process of the print data; and
a print job transmitting unit configured to transmit the attribute information generated by said attribute information generating unit to the image forming unit of said first image forming apparatus through the processing unit of said first image forming apparatus together with the image data generated by the rasterization process by said rasterization unit and the print settings of the image data, and
wherein the image forming unit of said first image forming apparatus includes:
a print job reception unit configured to receive the image data, the print settings, and the attribute information transmitted by said print job transmitting unit through the processing unit of said first image forming apparatus; and
an image forming unit configured to perform the image formation for the image data received by said print job reception unit based on the print settings and the attribute information received by said print job reception unit.

12. The image forming system as claimed in claim 11, wherein the attribute information is information that represents at least one of text, graphic, and image.

13. The image forming system as claimed in claim 11, wherein, in the image formation performed by said image forming unit of said first image forming apparatus based on said print settings and said attribute information, at least one of thinning, an outline process, and contour enhancement is performed.

14. The image forming system as claimed in claim 11, wherein said image forming system includes a plurality of said first image forming apparatuses, and the print setting registered by said registration unit is the print setting using the attribute information that is necessary for the image formation performed by the image forming unit of each of said first image forming apparatuses and is registered for each of said first image forming apparatuses in correspondence with a process of the image formation performed by the image forming unit of each of said first image forming apparatuses.

15. The image forming system as claimed in claim 11, wherein the image data received by the image forming unit of said first image forming apparatus through the processing unit of said first image forming apparatus is image data that is converted into image data, which can be used for the image formation by the image forming unit of said first image forming apparatus, by further performing a re-rasterization process by the processing unit of said first image forming apparatus for the image data generated by performing the rasterization process by the rasterization unit of said second image forming apparatus.

* * * * *